C. B. WHITTELSEY.
MANUFACTURE OF BLOCK TIRES.
APPLICATION FILED JAN. 14, 1915.

1,230,967.

Patented June 26, 1917.

Witnesses:
Veronica Braun
B. V. Mohan

Charles B. Whittelsey,
Inventor

By his Attorney
Ernest Hopkinson

UNITED STATES PATENT OFFICE.

CHARLES B. WHITTELSEY, OF HARTFORD, CONNECTICUT, ASSIGNOR TO THE HARTFORD RUBBER WORKS COMPANY, A CORPORATION OF CONNECTICUT.

MANUFACTURE OF BLOCK-TIRES.

1,230,967.   Specification of Letters Patent.   Patented June 26, 1917.

Application filed January 14, 1915. Serial No. 2,109.

*To all whom it may concern:*

Be it known that I, CHARLES B. WHITTELSEY, a citizen of the United States, and a resident of Hartford, county of Hartford, and State of Connecticut, have invented certain new and useful Improvements in the Manufacture of Block-Tires, of which the following is a full, clear, and exact description.

This invention relates to tires for vehicles, more particularly to block tires, and has for an object to provide a tire of this character in which each block is held in place by the wedge faces of clamp members which co-act with a metallic band on the felly of the wheel in forming a retaining channel for the tire.

A further object of the invention is to provide novel clamp members and novel cross pieces interfitting with the clamp members and engaged over projections on the ends of each block, whereby each individual block is separately held in place.

With the above objects in view the invention consists in certain novel details of construction and combinations of parts hereinafter fully described and claimed, it being understood that various modifications may be resorted to without departing from the scope or sacrificing any of the advantages of the invention.

The invention will be readily understood from the following description taken in connection with the accompanying drawing in which.

Figure 1:
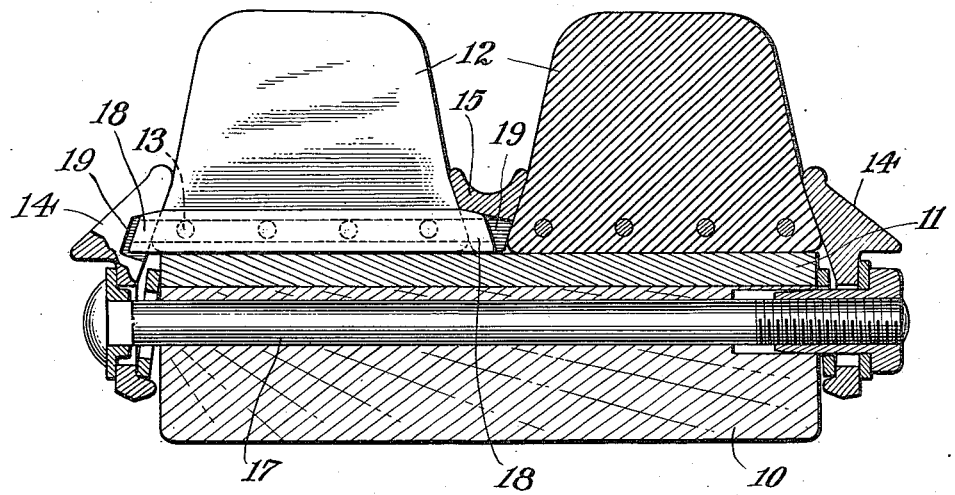
Figure 1 is a cross sectional view through a rim with my improved tire applied thereto.
Figure 2:
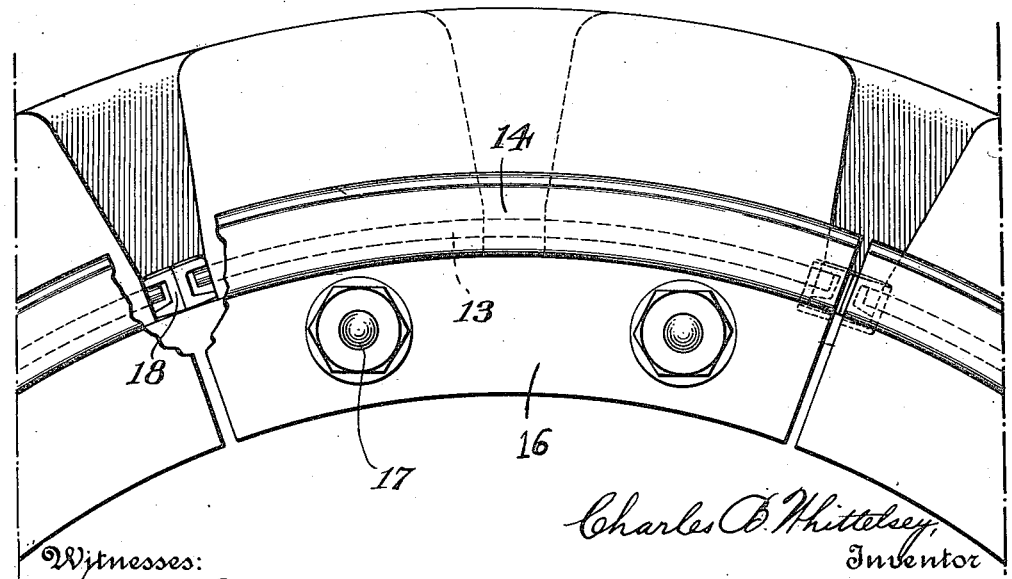
Fig. 2 is a fragmentary side elevation showing the tire and rim.

Referring now to the drawing in which like characters of reference designate similar parts in the various views, 10 designates the felly of an ordinary vehicle wheel, the same being equipped on the periphery with a metallic felly band 11, preferably formed of steel, these parts being of the usual and well known construction.

In carrying out the invention I provide a plurality of solid rubber blocks 12 adapted to seat firmly upon the felly band 11. These blocks have downwardly and outwardly sloping side faces as shown. Each block is equipped near the base with a row of wires 13 which extend longitudinally of the block and circumferentially of the felly band, and project at both ends from the end faces of the block.

For retaining the blocks detachably on the felly band I provide outer clamp members 14 and an intermediate clamp member 15, which all have lateral wedge faces for engagement with corresponding inclined side faces of the blocks as shown at Fig. 1, whereby the blocks are drawn down tightly against the felly band, and whereby these clamp members co-act with the felly band in forming a retaining channel for the blocks.

The intermediate clamp member is preferably annular, while the outer clamp members are formed of a number of separate sections 16 corresponding in length approximately to the length of each block, each pair of sections being removably secured together and to the felly by a bolt 17 and being substantially in register with a corresponding block, whereby the removal of one of the sections exposes the corresponding block for lateral removal from the felly band.

For holding each block individually in place, channeled cross pieces 18 are disposed transversely of the felly band and back to back at the ends of adjoining blocks and receive the projecting ends of the wires 13 thereof, these cross pieces having tapered or wedge ends which enter correspondingly shaped recesses 19 formed in the clamp members, the latter drawing the cross pieces firmly down against the felly band and thereby removably anchoring the blocks individually in place.

It will be understood that although two rows of blocks are shown, the blocks of each row being staggered relatively to the blocks of the next row, one row alone may be used, and in this connection, of course, the intermediate clamp 15 will be dispensed with.

From the above description it will be seen that I have provided a novel block tire which may be readily attached to the ordinary vehicle wheel equipped with an ordinary metallic tread band, and which is so connected that the individual blocks are firmly held in place by clamp members and cross pieces which co-act with the felly band in forming a retaining channel for the blocks.

What I claim and desire to protect by Letters Patent is:

The combination with a vehicle wheel, of a felly band, a plurality of resilient blocks seated on said band, clamp rings extending circumferentially of the band and engaging the sides of the blocks, a row of wires extending longitudinally through each block and disposed circumferentially of the felly band, and projecting from the ends of the block, and channeled cross-bars extending transversely of the felly band, and arranged back to back, and receiving within their channels the projecting wires of adjoining blocks, and having wedge ends removably fitted in correspondingly shaped recesses in said rings.

Signed at Hartford, county of Hartford, State of Connecticut, this 9th day of January, 1915.

CHARLES B. WHITTELSEY.

Witnesses:
ANNA M. WHITE,
SAM F. WHELAN.